United States Patent [19]
Dickman

[11] 3,817,434
[45] June 18, 1974

[54] CONCEALED AUTO LITTER RECEPTACLE

[76] Inventor: James J. Dickman, 2715 Durham Rd., York, Pa. 17402

[22] Filed: Dec. 14, 1972

[21] Appl. No.: 314,946

[52] U.S. Cl............ 224/42.42 A, 224/29 D, 248/99
[51] Int. Cl...................... B60r 11/00, B65b 67/04
[58] Field of Search...... 53/390; 141/313, 314, 316, 141/390, 391; 206/19.5 R; 224/42.42 A, 42.45 B, 42.45 R, 29 D; 248/99, 101

[56] References Cited
UNITED STATES PATENTS

| | | | |
|---|---|---|---|
| 497,870 | 5/1893 | Fjellman | 248/99 |
| 2,928,259 | 3/1960 | Mundle | 248/99 X |
| 2,931,550 | 4/1960 | Wood | 206/19.5 R |
| 2,966,290 | 12/1960 | De Angelis | 206/19.5 R |
| 3,082,863 | 3/1963 | Oharenko | 206/19.5 R |
| 3,300,082 | 1/1967 | Patterson | 248/99 X |
| 3,313,504 | 4/1967 | Stoltze | 248/99 |
| 3,627,243 | 12/1971 | Farrelli | 248/99 |

FOREIGN PATENTS OR APPLICATIONS

| | | | |
|---|---|---|---|
| 390,538 | 4/1933 | Great Britain | 141/391 |
| 973,632 | 10/1964 | Great Britain | 248/99 |

Primary Examiner—Robert L. Spruill
Attorney, Agent, or Firm—C. Hercus Just

[57] ABSTRACT

A litter receptacle for automobiles, including the cabs of trucks, buses and the like and having flexible supporting means substantially in the form of an oval loop to which the open end of a flexible, bag-like container is connected. Opposed portions of the loop are respectively engageable with spaced elements or surfaces on a vehicle, such as the lower rim of the front seat and the floor, whereby the flexibility of the supporting means serves to retain the container in a readily available position while disposed in a concealed area in the auto or other vehicle.

4 Claims, 11 Drawing Figures

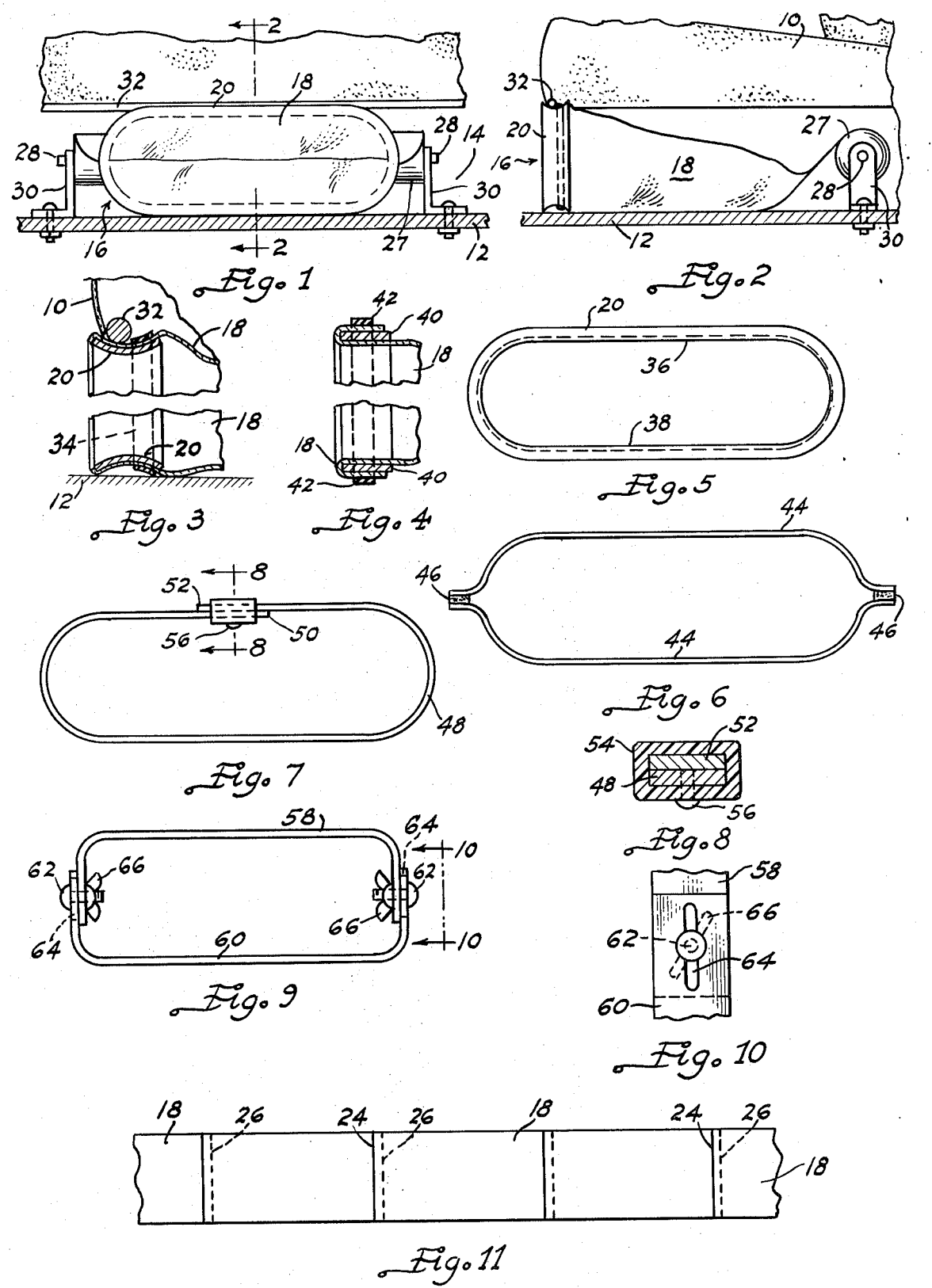

CONCEALED AUTO LITTER RECEPTACLE

BACKGROUND OF THE INVENTION

It is quite common at present to provide litter bags having a loop or hole formed in one side adjacent the open end of the bag in order to dispose the bag in hanging condition from a door handle, window-operating knob, ash tray knob, or otherwise in a automobile vehicle, truck, bus or otherwise. Litter bags of this type are unsightly and, particularly when the automobile is moving and the windows are down, incoming breezes frequently blow the bags around. Also, manipulating door handles and window-operating knobs when such bags are attached thereto is inconvenient and frequently results in the bags becoming detached therefrom and result in the bags spilling upon the floor and otherwise.

Various attempts have been made heretofore to provide litter receptacle which are supported by more sophisticated means than the knobs and handles referred to above. Included among such prior attempts are different types of receptacles mounted, for example, beneath the front seat of an automobile or cab of a truck for example, due to the fact that waste space usually occurs beneath such seats and said space also provides a handy location for a litter receptacle.

Illustrative of the prior devices referred to are the structures comprising the subject matters of the following patents. U.S. Pat. No. 2,931,550, to Wood, dated Apr. 5, 1960; U.S. Pat. No. 3,082,863, to Oharenko, dated Mar. 26, 1963; U.S. Pat. No. 3,131,813, to Jensen, dated May 5, 1964; and U.S. Pat. No. 3,625,347, to Trammell, dated Dec. 7, 1971. Without exception, all of said patents require special forms of mounting means, including slidable guideways for supporting drawers and similar storage devices, whereby, in addition to the cost factor, installation thereof also presents problems which tends to deter acceptance and popularity of such litter containing devices.

SUMMARY OF THE INVENTION

It is the principle purpose of the present invention to utilize readily available, flexible bags which are currently used for many purposes, including the merchandising of produce, wrapping bread, and the like, and provide supporting means generally in the form of a flexible oval loop or the like which has opposing surfaces capable of being compressed varying degrees toward each other for purposes of disposing the same between two opposing members or surfaces in an automobile such as between the lower edge of the front seat of such vehicle and the floor area immediately below said edge of the seat, whereby following the completetion of such positioning of the supporting member, the inherent resilience thereof expands the opposed portions of the supporting member into firm engagement with said opposing members or surfaces of the automobile vehicle and thus holds the open end of the flexible container or receptacle in operative position to receive litter simply by reaching downward below the front of the seat and tossing the litter into the container.

It is another object of the invention to form said opposing portions or surfaces of the supporting member so as to be concave in cross-section and thus provide surfaces readily engageable with the opposing members or surfaces of the automobile with which they are intended to engage, said concavity also providing convenient means to receive an elastic band, for example, which extends around the supporting member for purposes of effectively securing the open end of the flexible container to the supporting member when mounted in operative position.

It is a further object of the invention to form said supporting member from a strip of flexible material shaped into a loop having overlapping ends which are longitudinally adjustable relative to each other and thus provide the supporting member with desireable adjustability so as to conveniently adapt the same to engagement with opposed members or surfaces in a vehicle, as well as also to adapt the supporting member to bag-like containers of different circumferences.

It is still another object of the invention to provide a series of separable bag-like containers formed from a flat tube thereof of indefinite length which, at evenly spaced transverse locations is provided with seal lines and rows of perforations adjacent said lines to permit ready separation of the endmost container from the series thereof, said series being coiled into a compact roll and supported within the space adapted to receive the litter receptacle, whereby the endmost container is connected to the supporting member and, when the same is to be discarded, it is only necessary to pull said endmost container through the supporting member until the end of the next container is in position to be engaged by the supporting member, whereby the outermost one is torn from the next following container and is discarded, while the outerend of said next following container is mounted upon said supporting member.

Details of the foregoing objects and of the invention, as well as other objects thereof, are set forth in the following specification and illustrated in the accompanying drawing comprising apart thereof.

BRIEF DESCRIPTION OF THE DRAWING

FIG. 1 is a fragmentary vertical elevation illustrating an exemplary litter receptacle embodying the principles of the present invention and showing said receptacle mounted beneath a seat of an automobile vehicle.

FIG. 2 is a fragmentary vertical sectional view of the litter receptacle arrangement shown in FIG. 1 as seen in general on the line 2—2 thereof.

FIG. 3 is a fragmentary, enlarged vertical sectional view, foreshortened in a vertical direction, and showing on a larger scale than in FIG. 2 details of positioning means on the supporting member of the litter receptacle illustrated in the preceding figures.

FIG. 4 is a view similar to FIG. 3 but illustrating a different embodiment of supporting member.

FIG. 5 is a vertical elevation of the supporting member per se of the embodiment shown in FIGS. 1–3.

FIG. 6 is a view similar to FIG. 5 but illustrating another embodiment of supporting member per se.

FIG. 7 is a view similar to FIGS. 5 and 6 but illustrating a still further embodiment of supporting member.

FIG. 8 is a vertical sectional view of part of the structure shown in FIG. 7, as seen on the line 8—8 thereof, and illustrated on a larger scale than in FIG. 7.

FIG. 9 is a view similar to FIGS. 5–7 and showing a still further embodiment of supporting member.

FIG. 10 is an enlarged, fragmentary, vertical elevation of details of the supporting members shown in FIG. 9 as seen on the line 10—10 thereof.

FIG. 11 is a fragmentary plan view of a series of litter containers arranged in flat, tubular form and being illustrative of the type of coiled series of litter containers shown in the embodiment illustrated in FIGS. 1 and 2.

DETAILED DESCRIPTION

For purposes of illustrating exemplary means for mounting a litter receptacle in a more or less concealed condition in a vehicle such as a automobile, truck cab, and the like, attention is directed to FIGS. 1 and 2 in which an exemplary automobile seat 10 is shown in fragmentary vertical elevation in spaced relationship above the exemplary floor 12 of the vehicle. It is to be understood however that the space 14 beneath the seat 10 is merely intended to be representative of a number of spaces which may exist in an automobile vehicle and within which the litter receptacle 16, which comprises the invention, may be mounted in accordance with the principles of said invention.

The litter receptacle 16 essentially comprises, very simply, a container 18 and a supporting member 20. The container 18 preferably is formed inexpensively from sheet material such as thin, flexible, synthetic resin which is relatively durable and of the type, for example, commonly used to merchandise produce of various kinds, including loaves of bread, fruit, and many other items. If desired, the container 18 also may be formed from relatively durable paper products. Preferably, however, the containers 18 are of suitable size to receive a substantial amount of litter and refuse, without requiring frequent emptying, and the containers also preferably are waterproof. Accordingly, suitable synthetic resin sheet material is ideal for forming such containers, especially since a series thereof may be formed from a flat tube 22, such as shown in exemplary manner in FIG. 11, made of plastic sheeting. At regularly spaced intervals, seal lines 24 are provided to extend transversely across the tube. Immediately adjacent said seal lines are corresponding lines of perforations 26 by which the endmost container 18 may be separated readily from the next outermost container in the series.

Forming the containers 18 in a series such as shown in FIG. 11 renders the same readily capable of being formed into a compact coil 27, such as shown in exemplary manner in FIGS. 1 and 2. Said coil may be supported upon a suitable spindle 28, the opposite ends of which respectively are mounted in a pair of brackets 30 connected, for example, to the floor 12 of the vehicle or other supporting means. Preferably, appropriate means to provide a drag upon the coil 26 is employed to prevent unintentional uncoiling of the coil. A simple means to accomplish this may comprise frictional contact of the brackets 30 with opposite ends of the coil and any other suitable means may be used in lieu thereof.

The supporting member 20 may be formed in various ways and from different materials, if desired. For example, the member 20 illustrated in FIGS. 1-3, as shown in FIG. 3, preferably is concave in cross-section, for several purposes. One purpose is to enable the upper portion of the supporting member 20 to receive the lower front edge member 32 of the seat 10 and thus accurately position the supporting member relative to the seat. The opposed, lower portion of the member 20 engages the floor surface 12, as shown in FIGS. 1-3. A second purpose of the concavity of the supporting member 20 is to receive a flexible, securing band, such as a rubber band 34 of suitable size which extends around the open end portion of the container 18 which surrounds the supporting member 20 as illustrated in FIG. 1. The band 34 is best shown in FIG. 3. Further, the band 34 is useful to contract and pucker the open end of the container 18 in the event it is of larger circumference than the supporting member 20.

The supporting member 20 may be formed from any of a number of different types of material including synthetic resin, thin metal, or possibily thin wood, if desired, the principle requirement being that the member be resilient and flexible. Initially, for example, it is preferred that the member 20 be somewhat oval as shown generally in FIGS. 1, 5-7 and 9. Particularly in regard to the embodiments shown in FIGS. 1 and 5-7, the resilience of the resilient member is necessary due to the fact that the opposed, substantially parallel portions 36 and 38, as shown in FIG. 5, of the member 20 are spaced apart a greater distance than the vertical dimension, for example, of the space 14 within which the supporting member 20 is to be mounted. Accordingly, after the open end of one of the containers 18 is positioned around the outer surface of the member 20 or, if desired, is moved through the member 20 and the terminal end of the container is folded backward over the outer surfaces of the container 20 in order to connect the container and supporting member together, said opposing surfaces 36 and 38 than are momentarily compressed toward each other to insert the member 20 between the members or surfaces of the vehicle or otherwise which are to be engaged by the portions 38 and 36, followed by release of the same and thus permit the inherent resilience of the material to expand the opposed portions 36 and 38, respectively, for example, into engagement with the member 32 of seat 10 and the floor 12, as shown in FIG. 3.

The generally oval shape of the supporting member 20 is preferred in order to provide sufficient area for the open end of the receptacle through which litter and refuse is thrown to dispose it therein. Normal inertia of a moving vehicle usually is adequate to retain the litter within the receptacle. Particularly in regard to the concave nature of the supporting member 20, it also can be visilized from FIG. 3 in particular that a limited amount of damming is provided above the surface of the floor 12 at the entrance end of the container 18 which tends to deter movement of debris outwardly from the container during movement of a vehicle.

Referring to FIG. 4, it also will be seen that the supporting member 40 shown therein simply comprises a flat strip of material which may be similar to that from which the supporting member 20 if formed. It also will be seen from said figure that the open end of the container 18 is initially passed through the supporting member 20, which may be of any of the configurations desired such as shown in FIGS. 1 and 5, for example, and an elastic band 42 is positioned around the backwardly folded open end of the container to secure the same firmly with respect to supporting member 40. This embodiment of litter receptacle may be mounted between any opposing members or surfaces in a vehicle or otherwise which has dimensions adequate to receive the supporting member 40 and the container 18 connected thereto.

Referring to FIG. 6, if desired, the supporting member for the containers 18 may comprise a pair of similar members 44, the ends of which abut each other and are suitably connected together. In the event the members 44 are formed from synthetic resin, the connections may be made by cement 46. However, if the members 44 are made from strips of spring steel, for example, the connecting means 46 may comprise weldments.

In the embodiment illustrated in FIGS. 7 and 8, a strip 48 of suitable resilient material, such as synthetic resin, spring steel or otherwise, such as described above with respect to member 20, is arranged in generally elliptical or oval configuration by overlapping the ends 50 and 52 thereof. A retainer loop 54, of suitable material is extended around the overlapping ends 50 and 52 of strip 48. The loop 54 is relatively tight in order to provide at least limited friction. Also, in the preferred construction, the loop 54 is fixed against longitudinal movement relative to the end 50, for example, by means of a rivet or pin 56, while the end 52 may be slidably moved relative to end 50 by exercising appropriate force of limited nature. By this means, the circumference of the loop formed by the strip 48 may be adjusted either for purposes of accomodating the open end of the receptacle to a desired space or to accomodate the supporting member comprising strip 48 to a certain size of container 18. It will be understood that the open end of the container 18 may be connected to the loop comprising strip 48 by any of the means described above and especially that illustrated in FIG. 4 in which the supporting member 40 is shown to be formed from relatively flat strip material such as that contemplated for strip 48 in FIG. 7 and 8.

Still another means may be provided for adjusting the circumference of the supporting member, such as illustrated in FIG. 9 and 10. Referring thereto, it will be seen that a pair of similar members 58 and 60, which may be formed from any of the materials referred to above with respect to the foregoing supporting members, are shaped so that the ends thereof overlap with each other. For example, the ends of the member 58 are drilled to receive small clamping bolts 62, while the ends of member 60 are provided with slots 64, which are best shown in enlarged manner in FIG. 10, to permit limited adjustment of member 60 relative to member 58 and thereby expand or contract the circumference of the composite supporting member formed by members 58 and 60. An appropriate wing nut 66, or otherwise, may be used to maintain the desired adjustment of the members 58 and 60 relative to each other.

From the foregoing, it will be seen that the present invention provides a relatively simple, inexpensive, but highly effective and convenient litter receptacle for an automobile or other similar vehicle and in which the receptacle is held in convenient, open condition for the ready reception of refuse while the container of the receptacle is disposed in concealed manner in an appropriate space in said vehicle. Various embodiments of supporting means by which the open end of the container is operatively positioned within a space to which the supporting member is adapted simply by flexing opposed portions thereof toward or from each other and thereby provide means for connecting the supporting member to means in a vehicle to receive the same without requiring the use of any tools or special equipment. Further, a supply of unused containers readily is available in coiled form in accordance with the principles and thereby affording ready storage means for unused containers.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A concealed litter receptacle assembly adapted to be positioned beneath a seat of an automobile between an element on the underside of the seat and the floor thereof, said assembly comprising in combination, a flexible band adapted to be flexed into substantially oval shape to provide a pair of opposed portions respectively flexibly engageable with said element on the underside of an automobile seat and the floor thereof to support said band within a substantially vertical plane; and a bag-like receptacle made from flexible and collapsible material into a generally flattened tube closed at one end and open at the other, said open end of said receptacle extending around said band and said receptacle otherwise being adapted to extend rearwardly from said band and substantially horizontally within a space between said seat and floor of an automobile with the open end of said receptacle being held open by said band, the rim of said open end of said receptacle being substantially of the same circumference as said band and folded around said band to secure the same together and at least partially held connected by the engagement of said opposed portions of said band with said automobile seat and floor, and said band in cross-section being concaved to provide limited rigidity therefor and the concaved side thereof extending outward respectively to provide means to receive portions of the undersurface of said seat and frictional means to engage said floor surface of an automobile, thereby to secure and support said band in operative, substantially vertical position to hold the open end or said flexible receptacle in open position readily to receive refuse without any additional support means.

2. The receptacle according to claim 1 in which said band is formed from a strip into a loop having overlapping ends and including a retainer extending around said overlapping ends and frictionally engaging the same to permit relative sliding movement to adjust the circumference of said loop to that of the open end of said receptacle to insure firm engagement therebetween.

3. The receptacle according to claim 2 in which said retainer is a small loop fixed to one end of said supporting band and the other end of said band being frictionally slidable through said small loop.

4. The receptacle according to claim 1 in which said band comprises a pair of strips of flexible material spaced transversely apart and the ends of said strips being bent toward each other into overlapping relationship to form a loop, and said band further including connecting means cooperable with said overlapping ends to permit relative longitudinal adjustment between said ends to effect a circumference of desired dimension to firmly engage tHe open end of said receptacle.

\* \* \* \* \*